United States Patent
Schmidtke et al.

(10) Patent No.: US 6,404,585 B2
(45) Date of Patent: *Jun. 11, 2002

(54) CARTRIDGE HANDLING SYSTEM HAVING SHAPED CARTRIDGE STORAGE CONFIGURATION

(75) Inventors: Gregg S. Schmidtke; Robert L. Mueller, both of Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/799,834

(22) Filed: Mar. 5, 2001

Related U.S. Application Data

(63) Continuation of application No. 09/442,223, filed on Nov. 17, 1999, now Pat. No. 6,259,580, which is a continuation of application No. 09/045,134, filed on Mar. 20, 1998, now Pat. No. 6,025,972.

(51) Int. Cl.$^7$ .............................................. G11B 15/68
(52) U.S. Cl. ....................................................... 360/92
(58) Field of Search ........................................... 360/92

(56) References Cited

U.S. PATENT DOCUMENTS

| | | | |
|---|---|---|---|
| 4,504,936 A | 3/1985 | Faber et al. .................. 369/34 |
| 4,519,055 A | 5/1985 | Gilson ......................... 369/37 |
| 4,527,262 A | 7/1985 | Manto ......................... 369/33 |
| 4,635,150 A | 1/1987 | Kato et al. ............... 360/98.06 |
| 4,685,095 A | 8/1987 | Rudy et al. ................... 369/36 |
| 4,817,070 A | 3/1989 | Hug et al. ..................... 369/36 |
| 4,837,647 A | 6/1989 | Nonaka et al. ................ 360/92 |
| 4,891,720 A | 1/1990 | Grant et al. ................... 360/92 |
| 5,001,582 A | 3/1991 | Numasaki ................ 360/98.06 |
| 5,010,536 A | 4/1991 | Wanger et al. ................ 369/36 |
| 5,036,503 A | 7/1991 | Tomita ......................... 369/36 |
| 5,043,962 A | 8/1991 | Wanger et al. ................ 369/36 |
| 5,060,211 A | 10/1991 | Blanding ..................... 369/36 |
| 5,101,387 A | 3/1992 | Wanger et al. ................ 369/36 |
| 5,128,912 A | 7/1992 | Hug et al. ..................... 369/38 |
| 5,143,193 A | 9/1992 | Geraci ......................... 194/212 |
| 5,187,695 A | 2/1993 | Schindler et al. ............. 369/37 |
| 5,442,500 A | 8/1995 | Hidano et al. ................ 360/92 |
| 5,515,356 A | 5/1996 | Lee ............................ 369/178 |
| 5,544,146 A | 8/1996 | Luffel et al. ................ 369/178 |
| 5,596,556 A | 1/1997 | Luffel et al. .................. 369/36 |
| 5,640,288 A | 6/1997 | Horie ....................... 360/98.04 |
| 5,646,917 A | 7/1997 | Miyoshi et al. ............... 369/34 |
| 5,661,287 A | 8/1997 | Schaefer et al. ............. 253/383 |
| 5,682,096 A | 10/1997 | Christie, Jr. et al ...... 324/207.2 |
| 5,682,276 A | 10/1997 | Hinnen et al. ................ 360/92 |
| 5,739,978 A | 4/1998 | Ellis et al. .................... 360/92 |
| 5,808,828 A | 9/1998 | Forrer et al. .................. 360/92 |
| 6,155,766 A | * 12/2000 | Ostwald et al. ............. 414/279 |
| 6,236,530 B1 | * 5/2001 | Schneider et al. ............. 360/92 |

FOREIGN PATENT DOCUMENTS

| | | |
|---|---|---|
| EP | 697 695 A | 2/1996 |
| GB | 2 295 047 | 5/1996 |
| JP | 04095262 | 3/1992 |
| WO | WO 85/02051 | 5/1985 |

\* cited by examiner

*Primary Examiner*—David Hudspeth
*Assistant Examiner*—Angel Castro

(57) ABSTRACT

A cartridge handling system for storing and accessing at least one data cartridge according to the present invention may comprise a frame that defines at least one curvilinear cartridge access side. A curvilinear guide member is mounted to the frame so that substantially all points along the curvilinear guide member are positioned an equal spaced distance from the curvilinear cartridge access side defined by the frame. A cartridge access device is mounted to the curvilinear guide member so that a cartridge access end of the cartridge access device is positioned adjacent the curvilinear cartridge access side defined by the frame at substantially all positions along the curvilinear guide member. An actuator system operatively associated with the cartridge access device moves the cartridge access device along the curvilinear guide member.

30 Claims, 6 Drawing Sheets

CARTRIDGE HANDLING SYSTEM HAVING SHAPED CARTRIDGE STORAGE CONFIGURATION

CROSS-REFERENCE TO RELATED APPLICATIONS

This is a continuation of U.S. patent application Ser. No. 09/442,223, filed on Nov. 17, 1999, now U.S. Pat. No. 6,259,580 B1, which is a continuation of U.S. patent application Ser. No. 09/045,134, filed Mar. 20, 1998, now U.S. Pat. No. 6,025,972, both of which are incorporated herein by reference for all that they disclose.

FIELD OF INVENTION

This invention relates generally to data storage systems for handling and storing data cartridges, such as optical disk or magnetic tape cartridges, and more specifically to high density data storage systems having increased data storage capacity.

BACKGROUND

Many different types of data storage and handling systems exist and are being used to store data cartridges at known locations and to retrieve desired cartridges so that data may be written to or read from the data cartridges. Such data storage and handling systems are often referred to as "juke box" data storage systems, particulary if they can accommodate a large number of individual data cartridges.

A typical juke box data storage system may include one or more different types of cartridge receiving devices for holding the various data cartridges. For example, one type of cartridge receiving device may comprise a cartridge storage rack or "magazine" while another type of cartridge receiving device may comprise a cartridge read/write device. The cartridge storage racks or magazines serve to provide storage locations for the data cartridges and are commonly arranged so that they form one or more vertical stacks. The cartridge read/write device may be located adjacent the cartridge stack, although the cartridge read/write device may be positioned at any convenient location. The data storage system may also be provided with a cartridge access device for accessing the various data cartridges contained in the cartridge receiving devices and a positioning device for moving the cartridge access device among the cartridge receiving devices.

If a host computer system issues a request for data contained on a particular data cartridge, a control system associated with the data storage system actuates the positioning system to move the cartridge access device along the cartridge storage rack until the cartridge access device is positioned adjacent the desired data cartridge. The cartridge access device then removes the data cartridge from the cartridge storage rack and carries it to the cartridge read/write device. The cartridge access device inserts the selected data cartridge into the cartridge read/write device so that the host computer may thereafter read data from or write data to the data cartridge. After the read/write operation is complete, the cartridge access device may remove the data cartridge from the read/write device and return it to the appropriate location in the cartridge storage rack.

While data storage systems of the type described above work well and are currently being used, the continuing need to store ever increasing numbers of data cartridges can place significant limitations on the data storage system. For example, in data storage systems of the type described above, the data cartridges may be stored in one or more vertical columns stacks which define a single cartridge access plane. While the data storage capacity of such a system may be increased by increasing the number of data cartridges stored in the vertical columns, there is a limit to the maximum number of data cartridges that can be stored in a given column. That is, the higher the column (i.e., the more data cartridges that are stored in the column), the longer it takes the data access device to access a given data cartridge, particularly if the cartridge is located at one of the extreme ends of the column While more columns of shorter heights may be provided, this comes at the expense and difficulty of providing a positioning system capable of moving the cartridge access device vertically along a given column or stack as well as horizontally along the various rows of storage columns.

Partly in an effort to avoid the foregoing problems, data storage systems have been developed that store the data cartridges in two separate stacks or columns that define two separate cartridge access planes. For example, the data cartridges may be arranged in a pair of columns positioned on opposite sides of the cartridge access device. If this arrangement is used, it is necessary to provide the cartridge access device with a "pass-through" cartridge engaging assembly or picker that is capable of accessing the data cartridges stored in both stacks. Alternatively, such systems have been provided with "flipping" or rotating picker systems to access the data cartridges stored in both stacks.

While the "multi-plane" data storage systems of the type described above are currently being used, the pass-through, flipping, or rotating picker assemblies are relatively complex and expensive to manufacture. Such picker assemblies also tend to suffer from decreased reliability, primarily as a result of the relatively complex mechanical structure associated with such picker assemblies.

Another type of data storage system achieves the increased storage capacity associated with "multi-plane" data storage systems described above by arranging the data cartridges on a rotating magazine stack. While the rotating magazine stack usually does away with the need to provide a pass-through, flipping, or rotating picker, the mechanical complexity of the data storage system is usually just transferred from the picker to the rotating magazine stack. Consequently, data storage systems utilizing rotating magazine stacks often do not provide any significant advantages over "multi-plane" data storage systems that utilize pass-through, flipping, or rotating pickers.

Another problem associated with data storage systems of the type described above relates to the positioning system used to move the cartridge access device along the array of data cartridges. One type of positioning system, often referred to as a "lead-screw" system, mounts the cartridge access device on a lead-screw, which when turned, moves the cartridge access device up and down the array of cartridges. Unfortunately, the cantilever mounting arrangement that is often used to mount the cartridge access device on the lead-screw allows excessive transverse or rotational movement of the cartridge access device which tends to reduce positional accuracy and may make it difficult for the cartridge access device to engage the desired data cartridge.

One way to increase the stability of the cartridge access device, thus positional accuracy, of such a lead-screw positioning system is to use rigid guide rails to provide additional support to the cartridge access device. Disadvantageously, the guide rails usually comprise precision machined components which adds to the overall cost of the data storage system. Further, such guide rail assemblies are often difficult to align, and may become mis-aligned during subsequent shipping or movement of the data storage system, thereby requiring the positioning system to be re-aligned and re-calibrated before the data storage device can be placed in operation.

Consequently, a need remains for a data storage device having increased storage capacity but without the need for a pass-through, flipping, or rotating picker to access the data cartridges and without the need to resort to a moving or rotating cartridge magazine stack. Ideally, such a data storage system would provide for increased positional accuracy to reduce errors due to misalignment of the cartridge access device but without the need for precision machined guide rails. Still other advantages could be realized if the data storage system reduced the time required for initial alignment and calibration and provided increased immunity to subsequent mis-alignment, such as may occur during shipping or from rough handling.

SUMMARY OF THE INVENTION

A cartridge handling system for storing and accessing at least one data cartridge according to the present invention may comprise a frame that defines at least one curvilinear cartridge access side. A curvilinear guide member is mounted to the frame so that substantially all points along the curvilinear guide member are positioned an equal spaced distance from the curvilinear cartridge access side defined by the frame. A cartridge access device is mounted to the curvilinear guide member so that a cartridge access end of the cartridge access device is positioned adjacent the curvilinear cartridge access side defined by the frame at substantially all positions along the curvilinear guide member. An actuator system operatively associated with the cartridge access device moves the cartridge access device along the curvilinear guide member.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
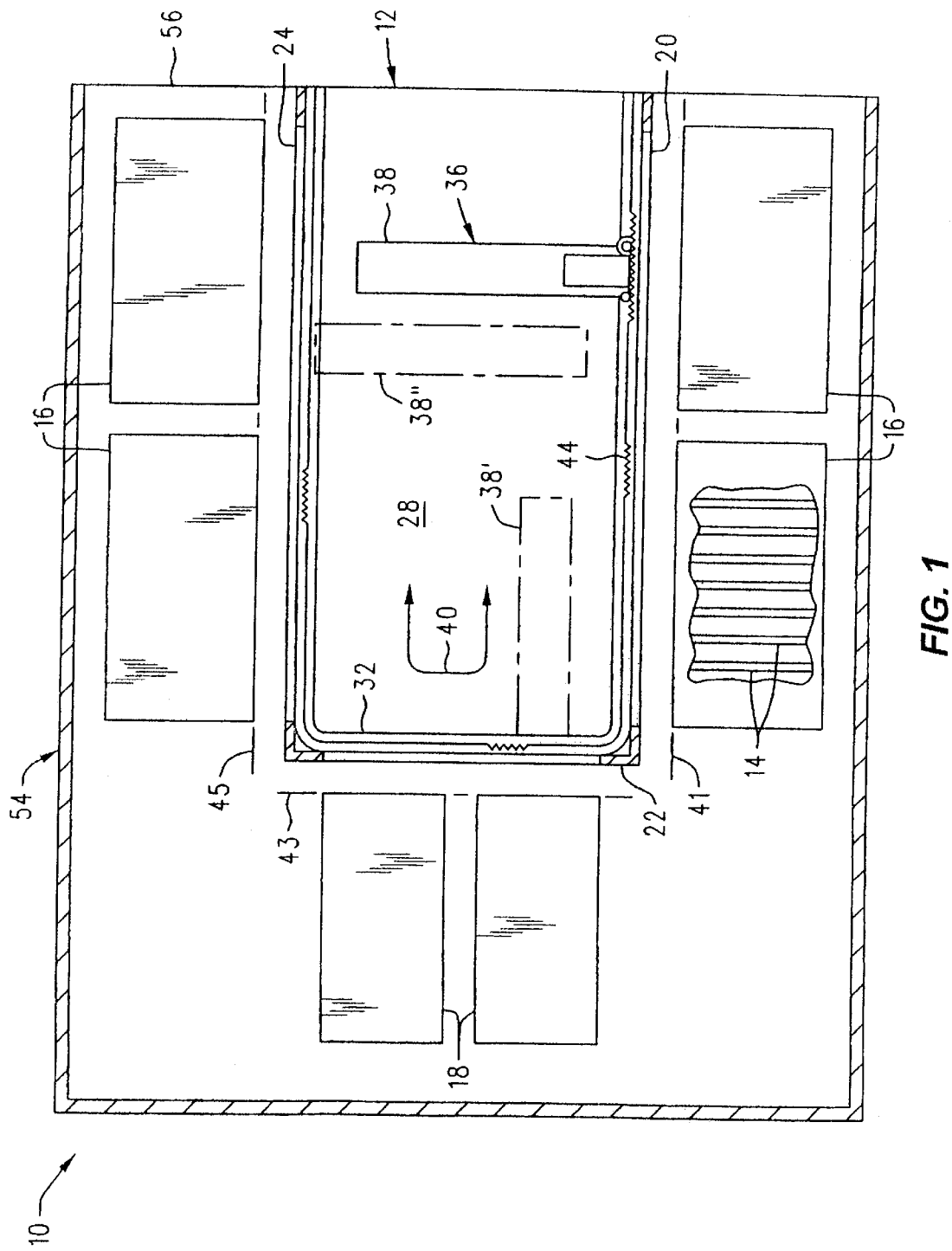
FIG. 1 is a plan view of a data storage system according to the present invention showing the cartridge access device in various positions.

A data storage system 10 according to the present invention is shown in FIG. 1 and may include a cartridge handling system 12 for transferring data cartridges 14 between one or more cartridge receiving devices, such as one or more cartridge storage racks or magazines 16 and one or more cartridge read/write devices 18. The various cartridge receiving devices (e.g., the cartridge storage racks or magazines 16 and the cartridge read/write devices 18) may be positioned at various locations around the cartridge handling system 12 so that they define the generally U-shaped configuration shown in FIG. 1. Accordingly, the data cartridges 14 may be accessed from three (3) cartridge access planes 41, 43, and 45.

Figure 2:
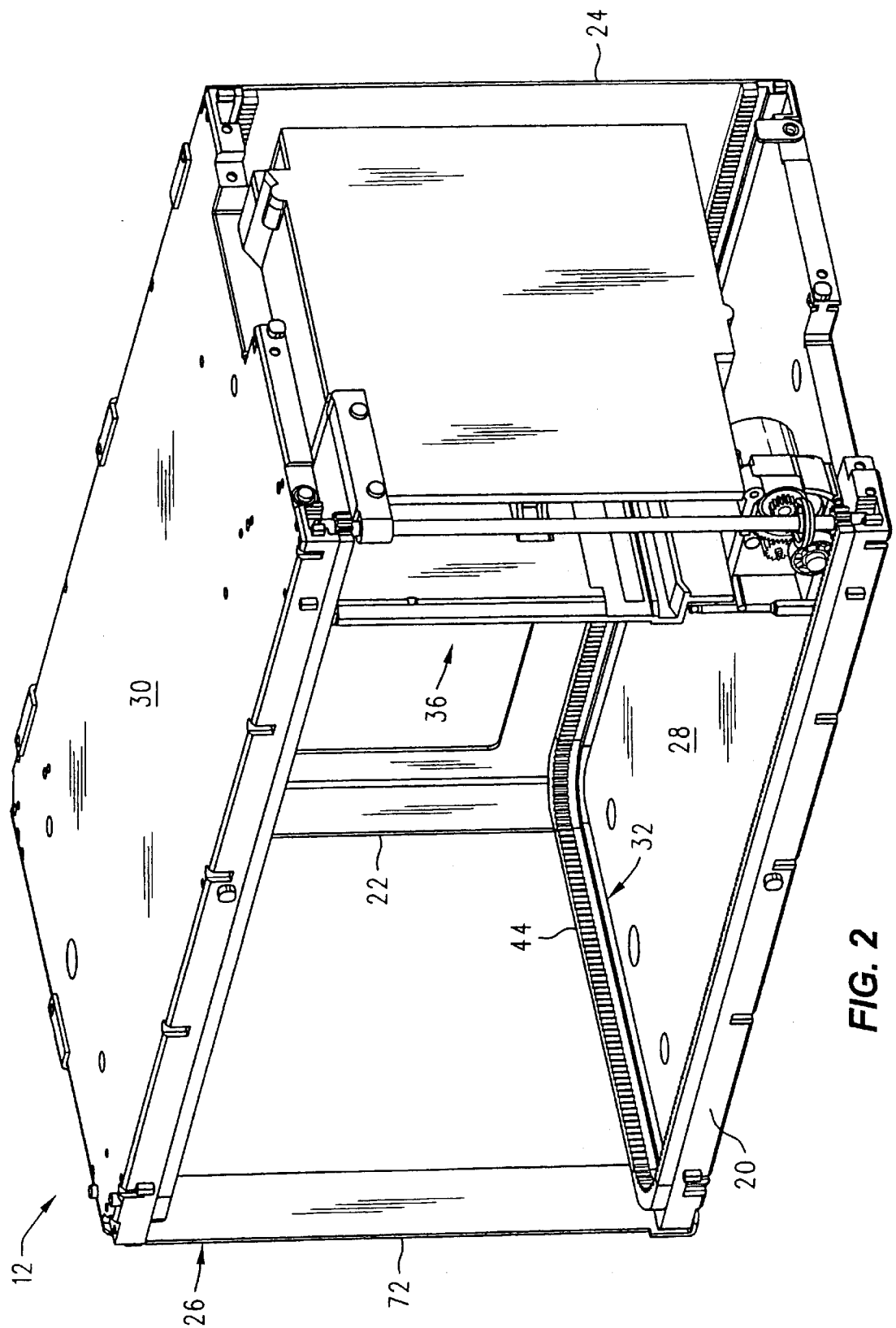
FIG. 2 is a perspective view of the cartridge handling system that may be used in the data storage system shown in FIG. 1.

The cartridge handling system 12 is best seen in FIG. 2 and may comprise a frame assembly 26 which includes a lower or base plate 28 and an upper or top plate 30 that are held in generally parallel, spaced-apart relation by a support structure 72. The frame assembly 26 of the cartridge handling system 12 may define a first cartridge access side 20, a second cartridge access side 22, and a third cartridge access side 24. The first and third cartridge access sides 20 and 24 may be positioned in generally spaced-apart relation, whereas the second cartridge access side 22 may be oriented generally transversely to the first and third cartridge access sides 20 and 24. The various cartridge receiving devices may be positioned around the cartridge handling system 12 so that the cartridge access planes 41, 43, and 45 defined by the cartridge receiving devices are located adjacent the three cartridge access sides 20, 22, and 24.

The lower plate 28 of frame assembly 26 may include a lower U-shaped guide member or channel 32 that forms a substantially continuous member along the first, second, and third cartridge access sides 20, 22, and 24 of the frame assembly 26. Similarly, the upper plate 30 may include an upper U-shaped guide member or channel 34 (FIG. 3) that also forms a substantially continuous member along the first, second, and third cartridge access sides 20, 22, and 24 of the frame assembly 26.

The cartridge handling system 12 may also include a cartridge access device 36 capable of loading and retrieving the data cartridges 14 from the cartridge receiving devices (e.g., cartridge storage racks 16 and the cartridge read/write devices 18). The cartridge access device 36 engages the upper and lower U-shaped guide members or channels 32, 34 in the respective lower and upper plates 28 and 30, and is thus guided by the lower and upper guide members 32 and 34 along the first, second, and third cartridge access sides 20, 22, and 24. That is, the cartridge engaging assembly 36 moves along a generally U-shaped path 40. For example, the cartridge access device 36 may be moved between a first position 38 adjacent the first access side 20 of frame assembly 26, a second position 38' adjacent the second access side 22, and a third position 38" adjacent the third access side 24, as best seen in FIG. 1. Of course, the cartridge access device 36 may also be moved from a position adjacent the third cartridge access side 24 to positions adjacent either the second cartridge access side 22 or the first cartridge access side 20.

Figure 5:
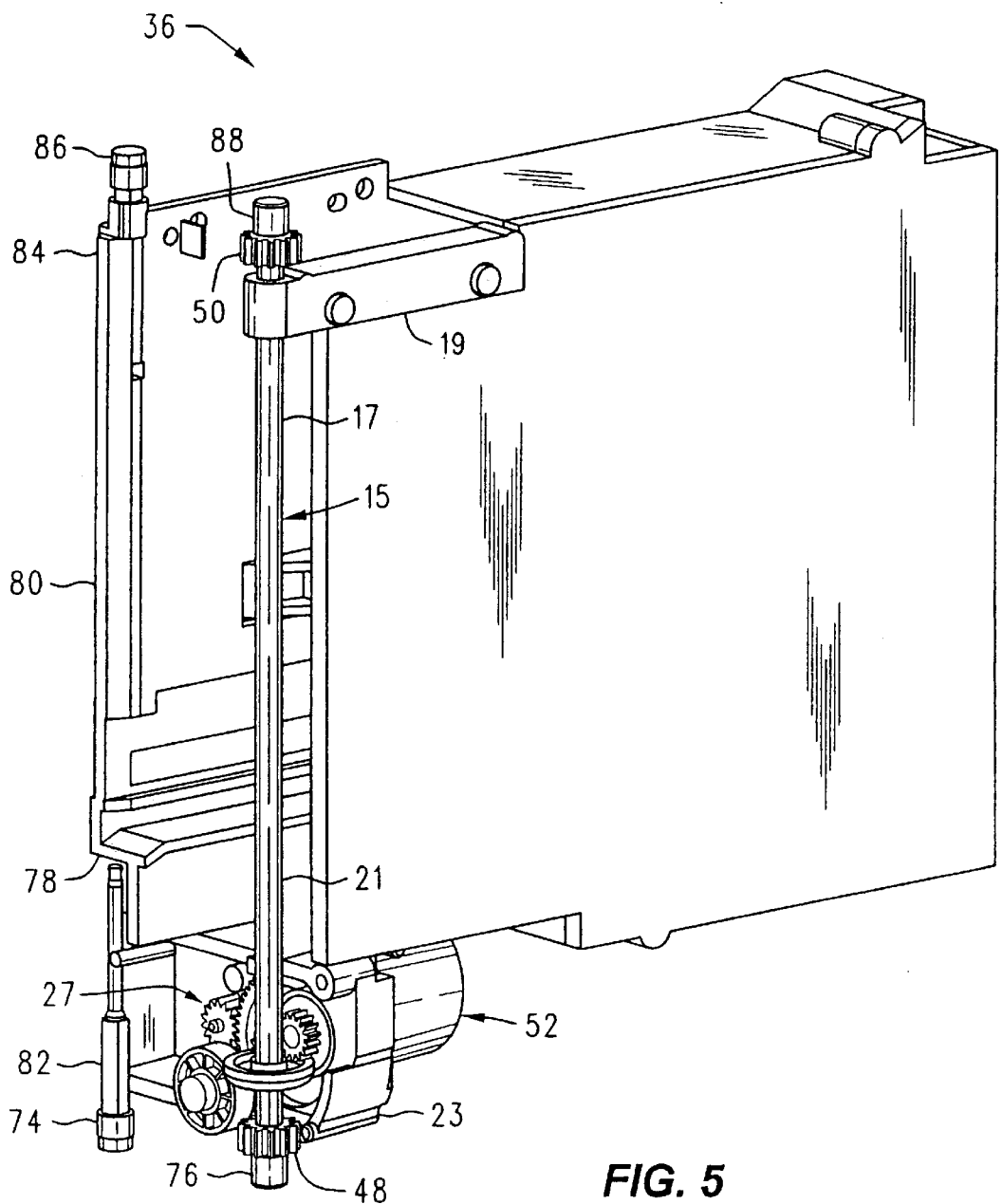
FIG. 5 is a perspective view of a cartridge access device showing the pinion drive system for moving the cartridge access device along the upper and lower guide members.
Figure 6:
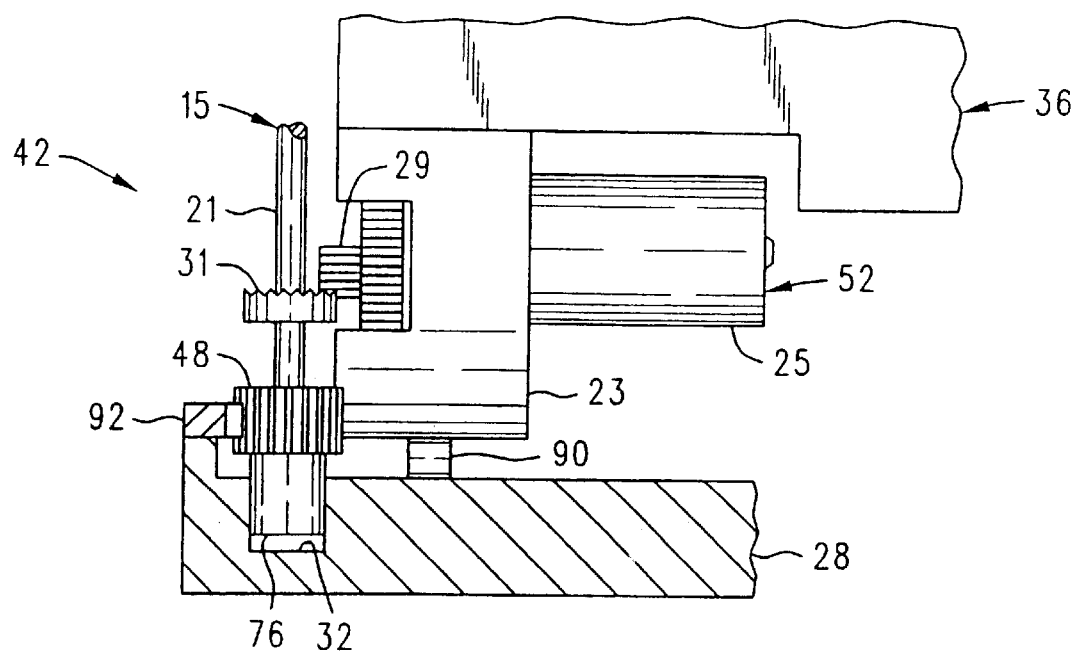
FIG. 6 is an enlarged side view in elevation of the actuator system and lower bearing and wheel assembly of the cartridge access device.
Figure 7:
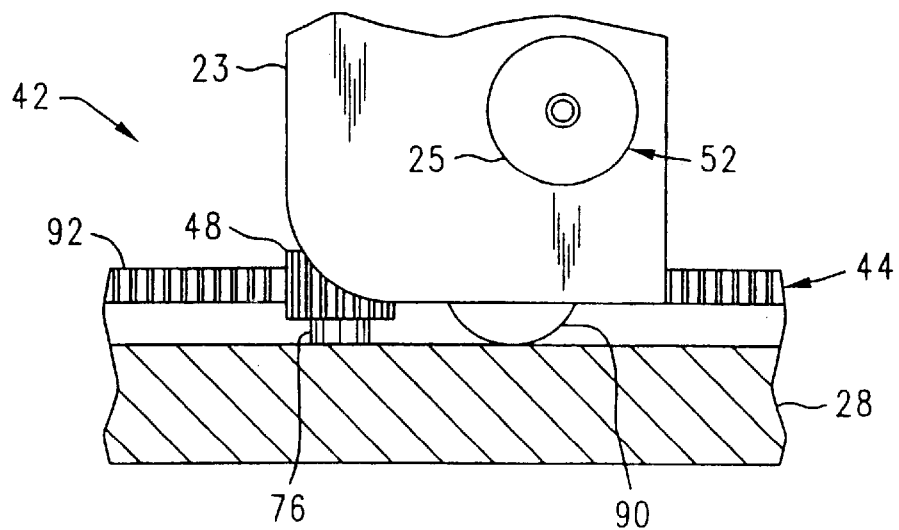
FIG. 7 is an enlarged end view in elevation of the actuator system and lower bearing and wheel assembly of the cartridge access device.

The cartridge access device 36 is moved along the lower and upper guide members 32 and 34 (i.e., following the U-shaped path 40) by an actuator system 42, as best seen in FIGS. 6 and 7. In one preferred embodiment, the actuator system 42 may comprise a rack and pinion drive system having a substantially continuous lower gear rack 44 provided on the lower plate 28 at a position adjacent the lower U-shaped guide member or channel 32. Accordingly, the lower gear rack 44 defines a substantially continuous, U-shaped member. An upper gear rack 46 may be provided on the upper plate 30 at a position adjacent the upper U-shaped guide member or channel 34. The upper gear rack 46 also defines a substantially continuous, U-shaped member. Lower and upper drive pinions 48 and 50 (FIG. 5) mounted to the cartridge access device 36 engage the respective lower and upper gear racks 44 and 46. A pinion drive assembly 52 mounted to the cartridge access device 36 rotates the lower and upper pinion gears 48 and 50, thereby moving the cartridge access device 36 back and fourth along the lower and upper guide members 32, 34, following the U-shaped path 40. See FIG. 1.

In operation, the data storage system 10 according to the present invention may be used to transfer a plurality of data cartridges 14 between the various cartridge receiving devices (e.g., cartridge storage racks or magazines 16 and the cartridge read/write devices 18) positioned adjacent the first, second, and third cartridge access sides 20, 22, and 24. For example, the data storage system 10 may be used by a host computer system (not shown) or other data processing system to store and access data contained in the data cartridges 14. If the host computer system (not shown) issues a request for data stored on a particular data cartridge 14, a control system (not shown) associated with the data storage system 10 operates the actuator system 42 on the cartridge access device 36 as necessary to move the cartridge access device 36 along the U-shaped path 40 until the cartridge access device 36 is located adjacent the appropriate data cartridge 14.

Consider, for example, an initial condition wherein the desired data cartridge 14 is stored in one of the cartridge storage racks or magazines 16. Upon receiving a request for the data cartridge 14 from the host computer system (not shown), the control system (not shown) operates the actuator system 42 to move the cartridge access device 36 along the U-shaped path 40 until the cartridge access device 36 is adjacent the selected data cartridge 14 in the storage rack 16. A cartridge engaging device or "picker" (not shown) associated with the cartridge access device 36 then engages the data cartridge 14 and draws it into the cartridge access device 36. The actuator system 42 then actuates the pinion drive assembly 52 as necessary to move the cartridge access device 36 to a desired cartridge read/write device 18. Once properly positioned adjacent the desired cartridge read/write device 18, the cartridge engaging assembly or picker (not shown) associated with the cartridge access device 36 loads the data cartridge 14 into the cartridge read/write device 18. The host computer system (not shown) may then access the data on the data cartridge 14 in the conventional manner.

When the data cartridge 14 is no longer needed, the control system (not shown) may operate the actuator system 42 to move the cartridge access device 36 along the U-shaped path 40 until the cartridge access device 36 is again located at a position adjacent the cartridge read/write device 18 (if the cartridge access device 36 is not already located in the appropriate position). Thereafter, the cartridge engaging assembly or picker (not shown) may retrieve the data cartridge 14 from the cartridge read/write device 18. The cartridge access device 36 may then return the data cartridge 14 to its appropriate location in the cartridge storage racks or magazines 16.

A significant advantage of the data storage system 10 according to the present invention is that it provides access to two or more planes (e.g., planes 41, 43, and 45) defined by cartridge receiving devices (e.g., cartridge storage racks or magazines 16 and/or cartridge read/write devices 18), but without the need to resort to "pass-through," "flipping," or "rotating" type cartridge engaging or "picker" devices, which are mechanically complex and may be expensive and unreliable. The data storage system 10 also provides access to two or more planes (e.g., 41, 43, and 45) of cartridge receiving devices, but without the need to use moving or rotating cartridge magazine stacks. Accordingly, the present invention provides high cartridge (i.e., data storage) density, while at the same time substantially reducing the mechanical complexity of the data storage system. Another advantage of the data storage system 10 according to the present invention is that it provides for improved user access to the cartridge magazines by allowing the same to be loaded and removed from one side of the data storage system 10.

Having briefly described the data storage system 10 according to the present invention, as well as some of its more significant features and advantages, the various embodiments of the data storage system will now be described in detail. However, before proceeding with the detailed description, it should be noted that while the data storage system 10 is shown and described herein as it could be used to store and retrieve magnetic data cartridges 14 having a certain size and configuration (e.g., DLT or digital linear tape cartridges), it is not limited to any particular type of data cartridge. Indeed, the data storage system 10 according to the present invention could be used with any type of data storage device comprising any type of data storage medium (e.g., magnetic disk or tape, optical disk, etc.). Consequently, the present invention should not be regarded as limited to use with the particular type and style of data cartridge 14 shown and described herein.

Referring back now to FIG. 1, one embodiment 10 of the data storage system according to the present invention may comprise a main housing or chassis 54 configured to hold the various components of the data storage system 10. For example, in one preferred embodiment, the main housing or chassis 54 may comprise a generally rectangularly shaped structure adapted to receive the cartridge handling system 12, and one or more cartridge receiving devices, such as one or more cartridge storage racks or magazines 16 and one or more cartridge read/write devices 18. The housing or chassis 54 may also be adapted to receive any of a wide range of other components or devices (e.g., control systems, power supplies, etc.) well-known in the art and that may be required or desired for the operation of the data storage system 10. The housing or chassis 54 may also be provided with a cartridge magazine access end 56 to allow a user (not shown) to access the cartridge storage racks or magazines 16. An access door (not shown) may be provided on the access end 56 to provide access to the cartridge magazines 16. In one preferred embodiment, the housing or chassis 54 is sized to be received by a standard storage rack system (not shown), such as an EIA rack assembly available from Crenlo Corp. of Minnesota (USA), although this is not required.

In one preferred embodiment, the cartridge handling system 12 may comprise a generally rectangularly shaped structure having a first cartridge access side 20, a second cartridge access side 22, and a third cartridge access side 24. As used herein, the term "cartridge access side" refers to any side of the cartridge handling system 12 from which data cartridges 14 may be accessed, either from a cartridge storage rack or magazine 16 or a cartridge read/write device 18.

The cartridge handling system 12 defines the general arrangement of the cartridge access planes associated with the cartridge receiving devices (e.g., the cartridge storage racks or magazines 16 and the cartridge read/write devices 18). That is, the cartridge receiving devices should be arranged around the cartridge handling system 12 so that the cartridge access planes defined by the cartridge receiving devices are located at positions adjacent the cartridge access sides of the cartridge handling system 12. For example, in one preferred embodiment, the various cartridge receiving devices (e.g., the cartridge storage racks or magazines 16 and cartridge read/write devices 18) are arranged around the cartridge handling system 12 so that first cartridge access plane 41 is positioned adjacent the first cartridge access side 20, the second cartridge access plane 43 is positioned adjacent the second cartridge access side 22, and the third cartridge access plane 45 is positioned adjacent the third cartridge access side 24.

In accordance with the forgoing considerations, the various cartridge receiving devices (e.g., the cartridge storage racks or magazines 16 and the cartridge read/write devices 18) may be located adjacent any cartridge access side (e.g., 20, 22, and 24) of the cartridge handling system 12 in any of a wide variety of arrangements. For example, in one preferred embodiment, two cartridge storage racks or magazines 16 are located adjacent the first cartridge access side 20 of the cartridge handling system 12, whereas another pair of magazines 16 are located adjacent the third cartridge access side 24. A pair of cartridge read/write devices or "drives" 18 are located adjacent the second cartridge access side 22 of the cartridge handling system 12. See FIG. 1. Alternatively, a greater or lesser number of cartridge storage racks 16 could be provided, or the cartridge read/write devices 18 could be located adjacent either or both of the first or third cartridge access sides 20 and 24.

The U-shaped arrangement of the cartridge storage magazines 16 and cartridge read/write devices 18 just described and shown in FIG. 1 for one preferred embodiment allows the various cartridge storage racks or magazines 16 to be easily accessed by a user (not shown) from the cartridge access end 56 of the chassis or housing assembly 54. That is, the user may replace the various magazines 16 from time to time to provide different data cartridges 14 to the data storage system 10. Alternatively, of course, the various cartridge storage racks or magazines 16 and cartridge read/write devices 18 could be configured around the cartridge handling system 12 in any other convenient arrangement depending on the requirements of the particular application.

Figure 3:
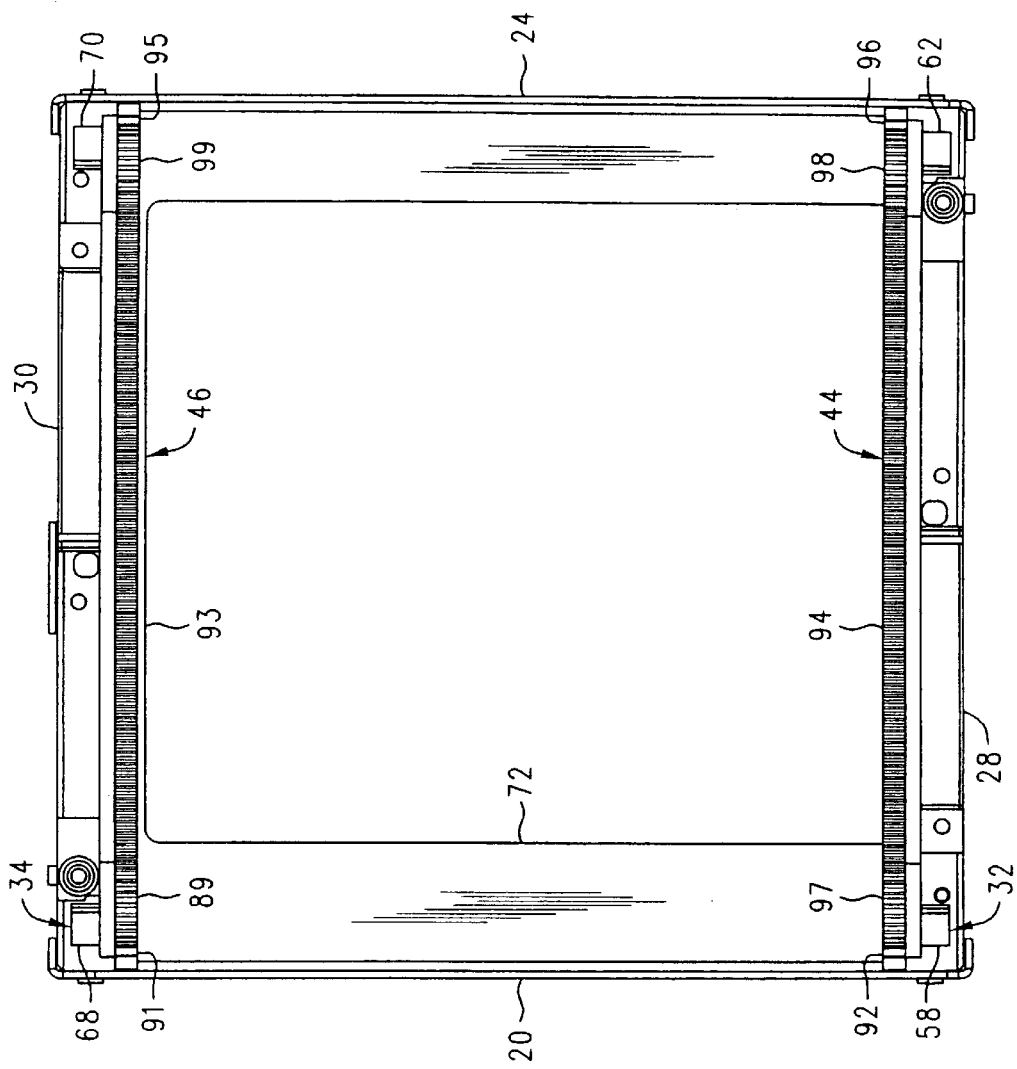
FIG. 3 is a side view in elevation of the frame assembly showing the upper and lower plates and corresponding upper and lower guide channels and gear racks.
Figure 4:
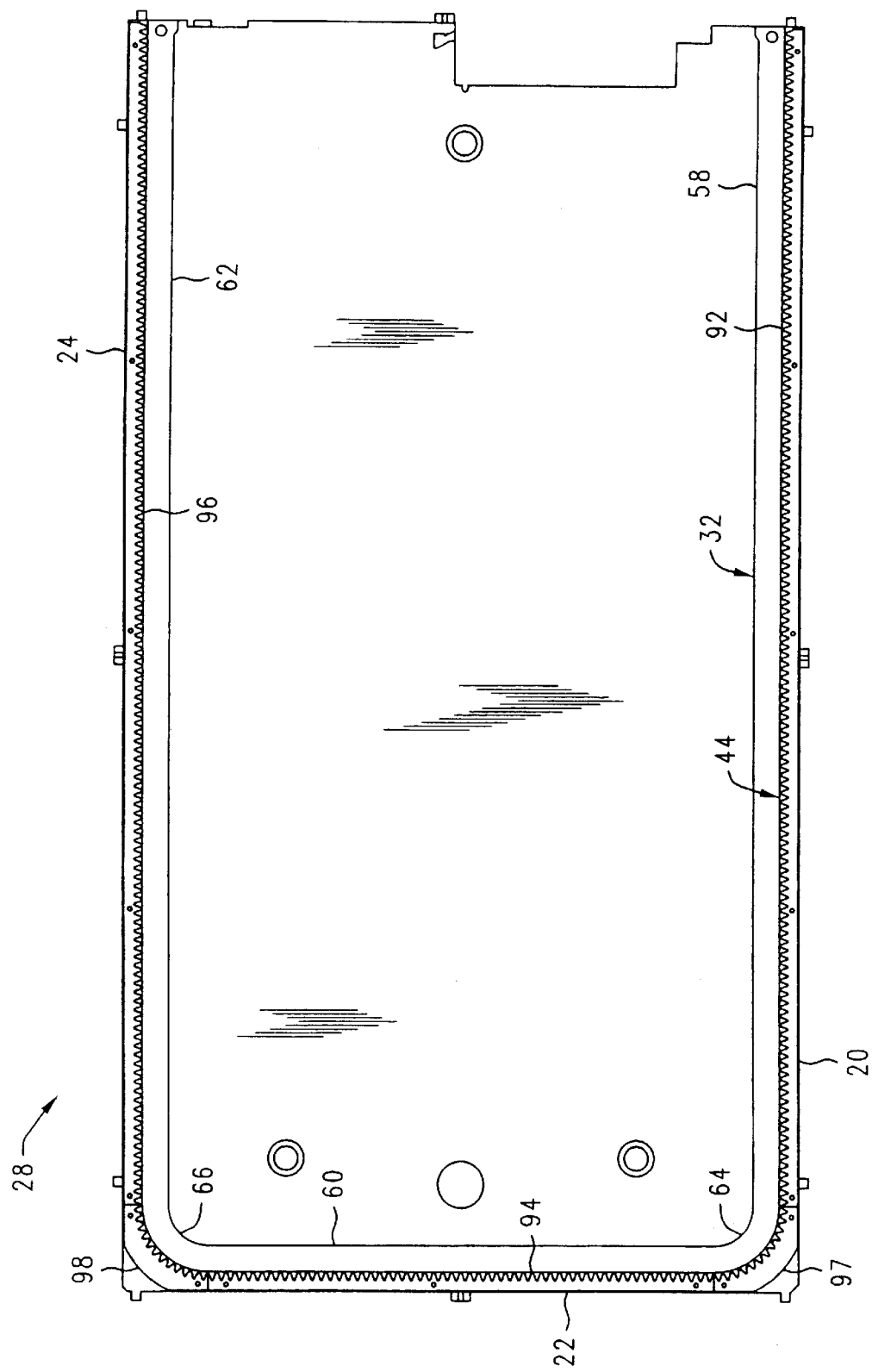
FIG. 4 is a plan view of the lower plate of the frame assembly showing the lower U-shaped guide member and lower U-shaped gear rack.

Continuing now with the description, the details of the cartridge handling system 12 are best seen in FIGS. 2–4, with occasional reference to FIG. 1. In one embodiment, the cartridge handling system 12 comprises a generally rectangular structure or frame assembly 26 that includes a lower or base plate 28, an upper or top plate 30, and a support structure 72. The support structure 72 holds or positions the lower plate 28 and upper plate 30 in generally parallel, spaced-apart relation, as best seen in FIG. 2. The frame assembly 26 defines a first cartridge access side 20, a second cartridge access side 22, and a third cartridge access side 24. The first and third cartridge access sides 20 and 24 are positioned in spaced-apart relation, whereas the second cartridge access side 22 is positioned generally transversely to the first and third cartridge access sides 20 and 24. Accordingly, the three cartridge access sides 20, 22, and 24 define a generally U-shaped configuration about which the various cartridge magazines 16 and read/write devices 18 may be arranged. See FIG. 1. Alternatively, however, the various cartridge access sides 20, 22, and 24 could be arranged in other configurations.

For example, instead of being positioned at substantially right angles to one another, the various cartridge access sides 20, 22, and 24 could be positioned so that they form oblique (i.e., non-perpendicular) angles with respect to one another, such as would be the case if the frame assembly 26 comprised a pentagonal (5-sided) or hexagonal (6-sided) configuration. In still another alternative, the cartridge access sides 20, 22, and 24 need not comprise straight segments, but could instead comprise curvilinear segments or portions, such as may be the case if the frame assembly 26 were provided with a circular or semi-circular cross-section. Consequently, the present invention should not be regarded as limited to a frame assembly 26 having cartridge access sides 20, 22, and 24 arranged according to the geometrical configurations shown and described herein.

The lower plate 28 is best seen in FIGS. 3 and 4 and may comprise a plate-like, generally rectangular member that includes a lower guide member or channel 32 therein. The lower guide member or channel 32 may comprise a first elongate section 58 located adjacent the first cartridge access side 20 and a second elongate section 60 located adjacent the second cartridge access side 22. The lower guide member or channel 32 may also include a third elongate section 62 that is located adjacent the third cartridge access side 24. The second elongate section 60 is joined to the first and third elongate sections 58 and 62 by respective rounded corner sections 64 and 66. Accordingly, the first, second, and third elongate sections 58, 60, and 62 define a substantially continuous guide member 32 that extends along the three cartridge access sides 20, 22, and 24 of the cartridge handling system 12.

The upper plate 30 is essentially identical to the lower plate 28 just described and may comprise a plate-like, generally rectangular member having an upper U-shaped guide member or channel 34 therein. The upper U-shaped guide member 34 may include first and third elongate sections 68 and 70 that are located adjacent the respective first and third cartridge access ends 20 and 24. See FIG. 3. The upper guide member or channel 34 may also include a second elongate section (not shown) located adjacent the second cartridge access side 22. The second elongate section (not shown) of the upper guide member or channel 34 is connected to the first and third elongate sections 68 and 70 by respective rounded corner sections (not shown) in a manner essentially identical to those of the lower guide member 32 in the lower plate 28.

The lower and upper plates 28 and 30 may be made from any of a wide range of materials, such as metals or plastics, suitable for the intended application. By way of example, in one preferred embodiment, the lower and upper plates 28 and 30 are molded as single pieces from a polycarbonate plastic material, although other materials could also be used. The lower and upper guide members or channels 32 and 34 formed within the lower and upper plates 28 and 30 may have any of a wide range of widths and depths suitable for the intended application. In one preferred embodiment, both lower and upper guide channels 32 and 34 have widths of about 7.16 mm and depths of about 6.0 mm.

The support structure 72 for holding the lower and upper plates 28 and 30 in essentially parallel, spaced-apart relation may be made from any of a wide range of materials, such as metals or plastics, suitable for the intended application. In one preferred embodiment, the support structure 72 is fabricated from sheet metal and is secured to the lower and upper plates 28 and 30 by any convenient fastener system or device (e.g., screws).

The cartridge access device 36 is best seen in FIGS. 2 and 5 and may comprise a structure sized to receive the data cartridges 14 (FIG. 1) used in the data storage system 10. The cartridge access device 36 may also be provided with a cartridge engaging assembly or "picker" (not shown) suitable for loading and retrieving the data cartridges 14 to and from the particular cartridge receiving device (e.g., cartridge storage rack 14 or cartridge read/write device 18) in which the data cartridge 14 is held. Examples of cartridge engaging assemblies or "pickers" suitable for use in the present invention are disclosed in the following U.S. patents which are specifically incorporated by reference herein for all that they disclose: U.S. Pat. No. 4,998,232 entitled "Optical Disk Handling Apparatus with Flip Latch;" U.S. Pat. No. 5,010, 536 entitled "Cartridge Handling System;" U.S. Pat. No. 5,014,255 entitled "Optical Disk Cartridge Handling Apparatus with Passive Cartridge Engagement Assembly;" and U.S. Pat. No. 5,043,962 entitled "Cartridge Handling System." Alternatively, any of a wide range of other types of cartridge engaging assemblies or pickers that are well-known in the art also may be used in the present invention. In any event, since such cartridge engaging assemblies or "pickers" are well-known in the art and are not necessary in understanding the present invention, the particular cartridge engaging assembly utilized in one preferred embodiment of the invention will not be described in further detail.

Regardless of the particular type of style of cartridge engaging assembly or "picker" that is utilized in the cartridge access device 36, the cartridge access device 36 may be mounted to the lower and upper U-shaped guide members 32 and 34 so that the cartridge access device 36 may be moved along the first, second and third cartridge access sides 20, 22, and 24 generally following the U-shaped path 40. See FIG. 1. More specifically, the cartridge access device 36 may be retained in the lower U-shaped guide member or channel 32 by a pair of lower bushing members 74 and 76 that extend from the bottom 78 of the cartridge access end 80 of the cartridge access device 36. In one preferred embodiment, the lower bushing member 74 may be attached to a shaft 82 that may be mounted to the gear case cover (not shown) for the gear case housing 23. Alternatively, other mounting arrangements could be used to attach the lower bushing member 74 to the cartridge access device 36, as would be obvious to persons having ordinary skill in the art. The lower bushing member 76 may be attached to the end of the lower pinion 48, in the manner best seen in FIG. 5, or may even comprise an integral portion of the lower pinion 48.

The top end 84 of the cartridge access device 36 may be provided with a pair of upper bushing members 86 and 88 that are sized to be slidably received in the upper U-shaped guide member or channel 34. The upper bushing 86 may be mounted to the top end 84 of the cartridge access end 80 of cartridge access device 36. The upper bushing 88 may be mounted to the end of the upper pinion 50, or may even comprise an integral portion of the upper pinion 50. The lower and upper bushings 74, 76, 86, and 88 guide the cartridge access device 36 along the lower and upper guide members 32 and 34 associated with the lower and upper plates 28 and 30. Finally, the bottom end 78 of cartridge access device 36 may be provided with a guide wheel 90 which contacts the lower plate 28 and supports the weight of the cartridge access device 36. See FIGS. 6 and 7. Optionally, the distal end 92 of the cartridge access device 36 also may be provided with a similar wheel arrangement (not shown) to support the distal end 92 of the cartridge access device 36.

The lower and upper bushing members 74, 76, 86, and 88 may be made from any of a wide range of materials, such as metals or plastics (e.g., brass or nylon), suitable for providing a low friction engagement with the respective lower and upper guide members or channels 32, 34 in the respective lower and upper plates 28 and 30. In one preferred embodiment, the lower and upper bushing members 74, 76, 86, and 88 are made from nylon and have diameters of about 7.01 mm which provides 0.15 mm of clearance between the bushing members and the guide channels, which, as mentioned above, have widths of about 7.16 mm.

As was briefly described above, the cartridge access device 36 is moved along the lower and upper guide members 32 and 34 by an actuator system 42, as best seen in FIGS. 3–7. In one preferred embodiment, the actuator system 42 may comprise a rack and pinion drive system having a substantially continuous lower gear rack 44 provided on the lower plate 28 at a position adjacent the lower U-shaped guide member or channel 32. Similarly, a substantially continuous upper gear rack 46 may be provided on the upper plate 30 at a position adjacent the upper U-shaped guide member or channel 34. Lower and upper drive pinions 48 and 50 (FIG. 5) mounted to the cartridge access device 36 engage the respective lower and upper gear racks 44 and 46. The pinion drive assembly 52 mounted to the cartridge access device 36 rotates the lower and upper pinion gears 48 and 50 to move the cartridge access device 36 back and fourth along the U-shaped path 40, as best seen in FIG. 1.

Referring now specifically to FIGS. 3 and 4, the lower gear rack 44 may comprise first and second elongate sections 92 and 94 that are provided on the lower plate 28 adjacent the first and second elongate sections 58 and 60 of the lower guide member or channel 32. A third elongate section 96 may be provided on the lower plate 28 at a position adjacent the third elongate section 62 of lower guide member 32. The second elongate section 94 of lower gear rack 44 may be joined to the first and third elongate sections 92 and 96 of lower gear rack 44 by respective rounded corner sections 97, 98, as best seen in FIG. 4. The lower gear rack 44 may therefore comprise a substantially continuous, U-shaped member that extends along substantially the entirety of the lower U-shaped guide member or channel 32, again as best seen in FIG. 4.

The upper gear rack 46 is essentially identical to the lower gear rack 44 just described and may include first and third elongate sections 91 and 95 that are provided on the upper plate 30 at positions adjacent the respective first and third elongate sections 68 and 70 of the upper guide member or channel 34. A second elongate section 93 may be provided on the upper plate 30 at a position adjacent the second elongate section (not shown) of upper guide member 34. The second elongate section 93 of upper gear rack 46 may be connected to the first and third elongate sections 91 and 95 of upper gear rack 46 by respective rounded corner sections 89 and 99, as best seen in FIG. 3. The upper gear rack 46 may therefore comprise a substantially continuous, U-shaped member that extends along substantially the entirety of the upper U-shaped guide member or channel 34.

The lower and upper gear racks 44 and 46 may be made from any of a wide variety of materials, such as metals or plastics, suitable for the intended application. By way of example, in one preferred embodiment wherein the lower and upper plates 28 and 30 are molded from a polycarbonate plastic material, the lower and upper gear racks 44 and 46 are provided as integrally molded portions of the lower and upper plates 28 and 30 (i.e., the lower and upper gear racks 44 and 46 comprise the polycarbonate plastic material). Alternatively, the lower and upper gear racks 44 and 46 may comprise separate components that are then fixedly attached to the lower and upper plates 28 and 30 by any of a wide range of fastening systems or devices (e.g., adhesives, screws, rivets, etc.).

The lower and upper gear racks 44 and 46 may be provided with any convenient tooth pitch suitable for the intended application. In one preferred embodiment, the lower and upper gear racks 44 and 46 may have a tooth pitch of about 32 (teeth/inch), although other tooth pitches may also be used.

Referring now to FIG. 5, the cartridge access device 36 may be provided with lower and upper pinion gears 48 and 50 which engage the lower and upper gear racks 44 and 46, respectively. The lower and upper pinion gears 48 and 50 may be mounted to a drive shaft assembly 15 which may be journalled for rotation in the cartridge access device 36. By way of example, in one preferred embodiment, the upper end 17 of drive shaft assembly 15 is journalled for rotation in an upper bearing member 19. The lower end 21 of drive shaft 15 may be journalled for rotation in the gear case cover (not shown) for gear case housing 23. Alternatively, other mounting arrangements are possible, as would be obvious to persons having ordinary skill in the art.

As was described above, the lower and upper bushings 76 and 88 may be mounted to the ends of the respective lower and upper pinion gears 48 and 50. Alternatively, the lower and upper bushings 76 and 88 may be mounted directly to the upper and lower ends 17 and 21 of drive shaft assembly 15.

The lower and upper drive pinions 48 and 50 are driven by a pinion drive assembly 52 that may be mounted to the cartridge access device 36. Referring now primarily to FIGS. 5–7, the pinion drive assembly 52 may comprise a motor 25 and a reduction gear assembly 27 mounted within gearbox housing 23. The reduction gear assembly 27 may comprise one or more spur gears for reducing the speed of the motor 25. The drive shaft assembly 15 may be operatively connected to the output pinion 29 of reduction gear assembly 27 by a face gear 31. Alternatively, other types of right angle gear arrangements may be used.

In one preferred embodiment, the reduction gear assembly 27 may be provided with a encoder system (not shown) to monitor the angular position of a selected gear in the reduction gear assembly 27. The angular position of the selected gear provided by the encoder system (not shown) may be used by the control system (not shown) to derive information about the position, velocity, and acceleration of the cartridge access device 36. However, since such encoder systems are well-known in the art and could be easily provided by persons having ordinary skill in the art after having become familiar with the teachings of the present invention, the particular encoder system utilized in one preferred embodiment of the present invention will not be described in further detail.

The reduction gear assembly 27 may comprise any of a wide variety of gear reduction systems, such as spur gear reduction systems, well-known in the art. Alternatively, a worm gear reduction system (not shown) could also be used. The motor 25 may comprise a permanent magnet d.c. motor, such as type RS-385PH, available from Mabuchi Motor Corp. of China. Alternatively, other types of motors may be provided. Of course, the characteristics of the particular type of motor that is selected will determine the reduction ratio that is provided by the reduction gear assembly 27. In one preferred embodiment, the reduction gear assembly 27 provides a reduction ratio of about 12:1, although other reduction ratios may be used.

In an alternative embodiment, other types of actuator systems 42 may be used to move the cartridge access device 36 along the lower and upper guide members or channels 32 and 34. For example, a chain or belt drive arrangement could be used to connect the motor 25 and the cartridge access device 36 to move the cartridge access device along the lower and upper guide members or channels 32 and 34. In yet another arrangement, a wire rope or "cable" and pulley arrangement may be used to connect the cartridge access device 36 to the motor 25.

As was mentioned above, the data storage system 10 may be provided with a control system (not shown) suitable for controlling, among other things, the actuator system 42 associated with the cartridge handling system 12. For example, such a control system would operate the actuator system 42 to move the cartridge access device 36 along the U-shaped path 40 (FIG. 1) so that the cartridge access device 36 may access the desired data cartridge 14 from either the cartridge storage rack or magazine 16 or the cartridge read/write device 18, as the case may be. However, since such control systems are well-known in the art and could be readily provided by persons having ordinary skill in the art, the particular control system used to control the operation of the actuator system 42 will not be described in further detail herein.

The data storage system 10 invention may be used to transfer a plurality of data cartridges 14 between the cartridge storage racks or magazines 16 and the cartridge read/write devices 18. For example, the data storage system 10 may be used by a computer system (not shown), or other data processing system, to store and access data contained in the data cartridges 14. If the computer system (not shown) issues a request for data stored on a particular data cartridge 14, the control system (not shown) associated with the data storage system 10 operates the actuator system 42 on the cartridge access device 36 as necessary to move the cartridge access device 36 along the U-shaped path 40 until the cartridge access end 80 of the cartridge access device 36 is located adjacent the appropriate data cartridge 14.

For example, if the desired data cartridge 14 is stored in one of the cartridge storage racks or magazines 16, then the actuator system 42 moves the cartridge access device 36 until the cartridge access end 80 is directly opposite the selected data cartridge 14. The cartridge engaging device or "picker" (not shown) associated with the cartridge access device 36 then engages the data cartridge 14 and draws it into the cartridge access device 36. Once the data cartridge 14 has been completely drawn into the cartridge access device 36, the actuator system 42 actuates the pinion drive assembly 52 as necessary to move the cartridge access device 36 to the desired cartridge read/write device 18. Once properly positioned adjacent the desired cartridge read/write device 18, the cartridge picker (not shown) loads the data cartridge 14 into the cartridge read/write device 18. The computer system (not shown) may then access the data on the data cartridge 14 in the conventional manner.

When the data cartridge 14 is no longer needed, the control system (not shown) would then move the cartridge access device 36 along the U-shaped path 40 to position the cartridge access end 80 of the cartridge access device 36 opposite the cartridge read/write device 18 (if the cartridge access device 36 is not already located in the appropriate position). Thereafter, the cartridge picker (not shown) may retrieve the data cartridge 14 from the cartridge read/write device 18. The cartridge access device 36 may then return the data cartridge 14 to its appropriate location in the cartridge storage racks or magazines 16.

It is contemplated that the inventive concepts herein described may be variously otherwise embodied and it is intended that the appended claims be construed to include alternative embodiments of the invention except insofar as limited by the prior art.

What is claimed is:

1. A cartridge handling system for storing and accessing at least one data cartridge, comprising:
   a frame defining at least one curvilinear cartridge access side;
   a curvilinear guide member mounted to said frame so that substantially all points along said curvilinear guide member are positioned an equal spaced distance from the curvilinear cartridge access side defined by said frame;
   a cartridge access device having a cartridge access end, said cartridge access device engaging said curvilinear guide member so that the cartridge access end of said cartridge access device is positioned adjacent the curvilinear cartridge access side defined by said frame at substantially all positions along said curvilinear guide member; and
   an actuator system operatively associated with said cartridge access device for moving said cartridge access device along said curvilinear guide member.

2. The cartridge handling system of claim 1, wherein said actuator system comprises:
   a substantially continuous gear rack having a curvilinear shape so that said substantially continuous gear rack is positioned a constant spaced distance from the curvilinear access side defined by said frame;
   a pinion gear mounted for rotation on said cartridge access device, said pinion gear engaging said gear rack; and
   a motor operatively associated with said pinion gear for rotating said pinion gear to cause said cartridge access device to move along said curvilinear guide member.

3. The cartridge handling system of claim 2, wherein said curvilinear guide member comprises a curvilinear channel and wherein said cartridge access device includes a bearing member that engages said curvilinear channel.

4. The cartridge handling system of claim 2, wherein said curvilinear guide member comprises a semi-circular section.

5. A cartridge handling system for storing and accessing at least one data cartridge, comprising:
   a frame defining a first cartridge access side and a second cartridge access side, the first and second cartridge access sides being substantially straight;
   a guide member mounted to said frame, said guide member comprising a first straight section located adjacent the first cartridge access side of said frame, a second straight section located adjacent the second cartridge access side of said frame, and a curved section connecting the first and second straight sections so that said guide member comprises a substantially continuous member having at least one straight section and at least one;
   a cartridge access device having a cartridge access end, said cartridge access device engaging said guide member so that the cartridge access end is adjacent the first cartridge access side when said cartridge access device is located on the first straight section of said guide member and so that the cartridge access end is adjacent the second cartridge access side when said cartridge access device is located on the second straight section of said guide member; and
   an actuator system operatively associated with said cartridge access device for moving said cartridge access device along said guide member.

6. The cartridge handing system of claim 5, wherein the second cartridge access side defined by said frame defines an oblique angle with respect to the first cartridge access side defined by said frame.

7. The cartridge handling system of claim 6, wherein said frame defines a third cartridge access side, the third cartridge access side being substantially straight and defining an oblique angle with respect to the second cartridge access side and wherein said guide member comprises a third straight section located adjacent the second cartridge access side of said frame and a second curved section connecting the second and third straight sections so that said guide member comprises a substantially continuous member.

8. A cartridge handling system for storing and accessing at least one data cartridge, comprising:
   a curvilinear guide member defining at least one curvilinear cartridge access side;
   a cartridge access device having a cartridge access end, said cartridge access device engaging said curvilinear guide member;
   a substantially continuous gear rack having a curvilinear shape so that said substantially continuous gear rack is positioned a constant spaced distance from said curvilinear guide member;
   a pinion gear mounted for rotation on said cartridge access device, said pinion gear engaging said substantially continuous gear rack; and
   a motor operatively associated with said pinion gear for rotating said pinion gear to cause said cartridge access device to move along said curvilinear guide member.

9. A cartridge handling system for storing and accessing at least one data cartridge, comprising:
   curvilinear guide member means for defining at least one curvilinear cartridge access side;
   cartridge access means for moving along said curvilinear guide member means and for accessing a data cartridge positioned adjacent the at least one curvilinear cartridge access side;
   actuator means operatively associated with said cartridge access means for moving said cartridge access means along said curvilinear guide member means.

10. A cartridge handling system for storing and accessing at least one data cartridge, comprising:
    a frame sized to receive the at least one data cartridge;
    a curved guide member mounted to said frame;
    a cartridge access device having a cartridge access end, said cartridge access device engaging said curved guide member so that the cartridge access end of said cartridge access device moves along a curved displacement path, the at least one data cartridge being positioned along the curved displacement path so that the at least one data cartridge can be accessed by said cartridge access device; and
    an actuator system operatively associated with said cartridge access device, said actuator system moving said cartridge access device along said curved guide member.

11. The cartridge handling system of claim 10, wherein said frame is sized to receive a plurality of data cartridges positioned adjacent the curved displacement path so that individual ones of the plurality of data cartridges can be selectively accessed by said cartridge access device.

12. The cartridge handling system of claim 11, wherein said curved guide member comprises a curved channel and wherein said cartridge access device includes a bearing member that engages said curved channel.

13. The cartridge handling system of claim 12, wherein said actuator system comprises:
- a substantially continuous gear rack having a curved shape so that said substantially continuous gear rack is positioned a uniform spaced distance from said curved guide member;
- a pinion gear mounted for rotation on said cartridge access device, said pinion gear engaging said gear rack; and
- a motor operatively associated with said pinion gear for rotating said pinion gear to cause said cartridge access device to move along said curved guide member.

14. A cartridge handling system for storing and accessing at least one data cartridge, comprising:
- a frame sized to receive the at least one data cartridge;
- a guide member mounted to said frame, said guide member including at least one straight section and at least one curved section;
- a cartridge access device having a cartridge access end, said cartridge access device engaging said guide member so that the cartridge access end of said cartridge access device moves along a displacement path having at least one straight section and at least one curved section, the at least one data cartridge being positioned along the displacement path so that the at least one data cartridge can be accessed by said cartridge access device; and
- an actuator system operatively associated with said cartridge access device, said actuator system moving said cartridge access device along said guide member.

15. The cartridge handling system of claim 14, wherein said frame is sized to receive a plurality of data cartridges positioned along the displacement path so that individual ones of the plurality of data cartridges can be selectively accessed by said cartridge access device.

16. The cartridge handling system of claim 15, wherein said guide member comprises a channel portion having at least one straight section and at least one curved section and wherein said cartridge access device includes a bearing member that engages said channel portion.

17. The cartridge handling system of claim 16, wherein said actuator system comprises:
- a substantially continuous gear rack having at least one straight section and at least one curved section so that said substantially continuous gear rack is positioned a uniform spaced distance from the respective straight and curved sections of said guide member;
- a pinion gear mounted for rotation on said cartridge access device, said pinion gear engaging said gear rack; and
- a motor operatively associated with said pinion gear for rotating said pinion gear to cause said cartridge access device to move along said guide member.

18. A cartridge handling system, comprising:
- a curvilinear guide member having at least one straight section and at least one curved section;
- a cartridge access device having a cartridge access end, said cartridge access device engaging said curvilinear guide member so that the cartridge access end of said cartridge access device moves along a path; and
- an actuator system operatively associated with said cartridge access device, said actuator system moving said cartridge access device along said curvilinear guide member.

19. The cartridge handling system of claim 18, wherein said curvilinear guide member comprises a base member defining at least one slot therein.

20. The cartridge handling system of claim 18, further comprising a cartridge receiving device positioned adjacent said curvilinear guide member, said cartridge receiving device sized to hold at least one data cartridge adjacent the path.

21. The cartridge handling system of claim 18, wherein said actuator system comprises:
- a gear rack positioned adjacent said curvilinear guide member;
- a pinion gear mounted for rotation on said cartridge access device, said pinion gear engaging said gear rack; and
- a motor operatively associated with said pinion gear, said motor rotating said pinion gear to cause said cartridge access device to move along said curvilinear guide member.

22. The cartridge handling system of claim 18, wherein the path along which is moved the cartridge access end of said cartridge access device comprises a U-shaped path.

23. The cartridge handling system of claim 22, further comprising a first cartridge receiving device positioned adjacent a first leg of the U-shaped path and a second cartridge receiving device positioned adjacent a second leg of the U-shaped path.

24. The cartridge handling system of claim 23, wherein said curvilinear guide member comprises a base member having at least one slot provided therein.

25. A cartridge handing system, comprising:
- a base member defining at least one curvilinear slot therein, the at least one curvilinear slot having at least one straight section and at least one curved section;
- a cartridge access device having a cartridge access end, said cartridge access device engaging the at least one slot in said base member so that the cartridge access end of said cartridge access device moves along a path;
- a gear rack provided on said base member;
- a pinion gear mounted for rotation on said cartridge access device, said pinion gear engaging said gear rack; and
- a motor operatively associated with said pinion gear, said motor rotating said pinion gear to cause said cartridge access device to move along the at least once slot in said base member.

26. The cartridge handling system of claim 25, further comprising a cartridge receiving device positioned adjacent the at least one slot in said base member.

27. The cartridge handling system of claim 26, further comprising at least one bearing member mounted to said cartridge access device, said at least one bearing member being sized to engage the at least one slot in said base member.

28. A cartridge handling system, comprising:
- guide member means for defining a generally U-shaped path;
- cartridge access means for releasably transporting a data cartridge, said cartridge access means being mounted to said guide member means so that a cartridge access end of said cartridge access means moves along the U-shaped path; and
- actuator means operatively associated with said cartridge access means for moving said cartridge access means along said guide member means.

29. The cartridge handling system of claim 28, further comprising cartridge receiving means for receiving at least one data cartridge, said cartridge receiving means being positioned adjacent said guide member means so that said cartridge receiving means is positioned along the generally U-shaped path.

30. A cartridge handling system, comprising:
- a base member defining at least one curvilinear slot therein, the at least one curvilinear slot having at least one straight section and at least one curved section;
- a cartridge access device having a cartridge access end, said cartridge access device engaging the at least one slot in said base member so that the cartridge access end of said cartridge access device moves along a U-shaped path;
- a gear rack provided on said base member;
- a pinion gear mounted for rotation on said cartridge access device, said pinion gear engaging said gear rack; and
- a motor operatively associated with said pinion gear, said motor rotating said pinion gear to cause said cartridge access device to move along the at least once slot in said base member.

* * * * *